No. 742,060. PATENTED OCT. 20, 1903.
J. PFEIFER.
CASH REGISTER, INDICATOR, AND RECORDER.
APPLICATION FILED JAN. 27, 1902.
NO MODEL. 7 SHEETS—SHEET 1.

WITNESSES:
INVENTOR.
BY
ATTORNEYS

No. 742,060. PATENTED OCT. 20, 1903.
J. PFEIFER.
CASH REGISTER, INDICATOR, AND RECORDER.
APPLICATION FILED JAN. 27, 1902.
NO MODEL. 7 SHEETS—SHEET 2.

Fig. 2.

No. 742,060. PATENTED OCT. 20, 1903.
J. PFEIFER.
CASH REGISTER, INDICATOR, AND RECORDER.
APPLICATION FILED JAN. 27, 1902.
NO MODEL. 7 SHEETS—SHEET 3.

WITNESSES:
INVENTOR
BY
ATTORNEYS

No. 742,060. PATENTED OCT. 20, 1903.
J. PFEIFER.
CASH REGISTER, INDICATOR, AND RECORDER.
APPLICATION FILED JAN. 27, 1902.
NO MODEL. 7 SHEETS—SHEET 4.

WITNESSES: INVENTOR.
BY John Pfeifer
ATTORNEYS

No. 742,060. PATENTED OCT. 20, 1903.
J. PFEIFER.
CASH REGISTER, INDICATOR, AND RECORDER.
APPLICATION FILED JAN. 27, 1902.
NO MODEL. 7 SHEETS—SHEET 7.

WITNESSES:
INVENTOR
BY
ATTORNEYS

No. 742,060.

Patented October 20, 1903.

UNITED STATES PATENT OFFICE.

JOHN PFEIFER, OF SPRINGFIELD, OHIO, ASSIGNOR, BY MESNE ASSIGNMENTS, TO NATIONAL CASH REGISTER COMPANY, OF JERSEY CITY, NEW JERSEY, A CORPORATION OF NEW JERSEY.

CASH REGISTER, INDICATOR, AND RECORDER.

SPECIFICATION forming part of Letters Patent No. 742,060, dated October 20, 1903.

Application filed January 27, 1902. Serial No. 91,383. (No model.)

*To all whom it may concern:*

Be it known that I, JOHN PFEIFER, a citizen of the United States, residing at Springfield, in the county of Clark and State of Ohio, have invented certain new and useful Improvements in Cash Registers, Indicators, and Recorders, of which the following is a specification.

My invention relates to improvements in cash registers and indicators.

The object of my invention is to provide in machines of this class printing mechanism by which the amounts of the different registrations may be recorded, so that a complete printed record may be had of all transactions.

A further object of my invention is to provide means for making a record of the particular clerk or person making any transaction on the machine.

A further object of my invention is to provide means for connecting certain of the keys of the tens denomination with the releasing device for the units mechanism, so that by the operation of any of such tens-keys a certain amount in the units denomination may also be registered and indicated.

My invention consists in the constructions and combinations of parts hereinafter described and claimed.

In the accompanying drawings, Fig. 3 is a rear view of the printing mechanism, showing the means for connecting same to the operating parts of the machine. Fig. 4 is a sectional view on the line $v\ v$ in Fig. 1, showing the means for connecting the printing mechanism to the swinging segments. Figs. 5, 6, 7, 8, and 9 are detail views of the printing mechanism hereinafter referred to. Figs. 15 and 16 are details of the same, hereinafter referred to.

Like parts are represented by similar characters of reference in the several views.

The class of machine to which I have applied my improvements is described in my prior patents, No. 579,604, of March 30, 1897, and No. 642,713, of February 6, 1900, in which is employed a main operating-shaft 1, extending the entire width of the machine, to which is connected an operating-lever $a$ for rotating the same. In the present machine I have shown two series of cash-keys arranged in two rows—a dollar series $b$ from "1" to "9," arranged in both rows of keys at the left side of the keyboard, and a tens series $b'$, running from "10" to "95," also arranged in both rows—and at the right side of the keyboard in the lower row I have shown a single unit-key $b^2$ to represent five cents, although, if desired, a full set of units-keys from "1" to "9" may be employed. These keys are all journaled on the shaft 2, and their inner sides are adapted to form stops for the swinging segments $c$, pivoted on the shaft 1, these segments being connected to the vertically-moving racks $c'$ by means of the arms $c^2$ and links $c^3$ for the purpose of operating the registering and indicating mechanism.

Figure 19:
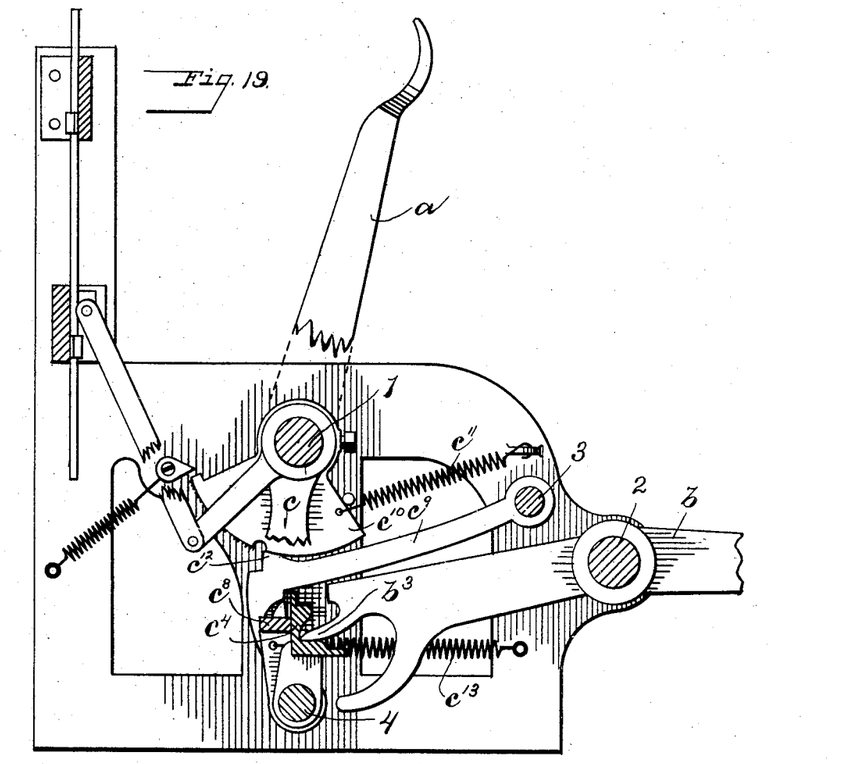
Figs. 19 and 20 illustrate the locking and releasing devices for the keys.
Figure 20:
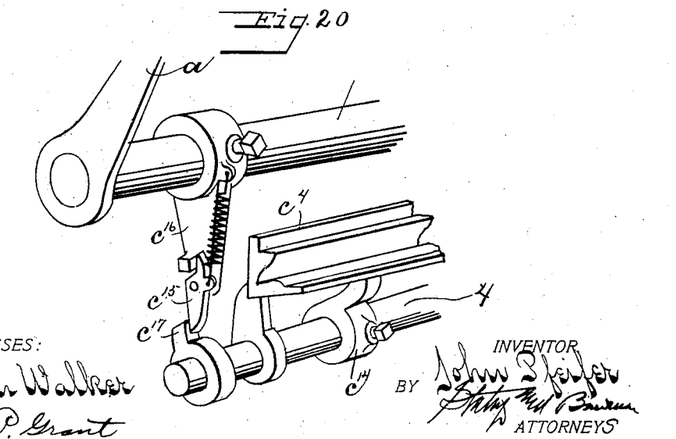

The registering mechanism is not shown in detail in the present drawings; but reference is made to my Patent No. 673,625, dated May 7, 1901, in which is described the registering mechanism which I preferably employ. The keys are normally held locked by swinging locking-plates $c^4$, which are adapted to be unlocked by the operation of the lever $a$, which operation also releases the swinging segments. In their normal position the keys are locked by the swinging locking-plate $c^4$, which engages with one arm $b^3$ of the bifurcated end of the key-lever, as shown in Fig. 19, there being one of these swinging locking-plates for each section. A locking-bar $c^5$ engages with all of the locking-plates, and this locking-bar is held locked by an arm $c^9$ at one end of the machine, which in turn is secured by a swinging cam or segment $c^{10}$ on the main shaft 1 and held in normal position by the spring $c^{11}$. When the operating-lever $a$ is pulled down, the segment or cam $c^{10}$ passes the projection $c^{12}$ on the locking-arm, and thus releases the locking-bar $c^8$ and permits the keys to be moved. The locking-plates $c^4$ are returned by the spring $c^{13}$ as soon as the keys have passed the locking edge of the plate, and thus hold the keys in their moved position. To provide for releasing the keys which have been depressed, I employ on the shaft 4 a series of dogs $c^{14}$—one for each locking-plate— and I further provide a pivoted spring-actuated pawl $c^{15}$ on the arm $c^{16}$ on the shaft 1, so that when the shaft 1 is operated in one direction said pawl contacts with the lug $c^{17}$ on the shaft 4 and swings said locking-plates to release the keys and allow them to resume their normal position, the pawl $c^{15}$ on its return movement passing freely over the lug $c^{17}$.

To provide for making a printed record of all registrations made upon the machine, I employ a printing mechanism, which is arranged at one side of the machine, preferably that side upon which the operating-lever $a$ is placed, and which is described as follows: $d$ represents a series of type members in the form of type-bars, although type-wheels may be employed, one type-bar being employed for each denomination represented on the keyboard. These bars are supported in the slotted guides $d'$, secured to the side frame of the machine, and are each provided on one side with type $d^2$, representing figures from "0" to "9," running from the bottom upwardly in proper numerical order, and on the other side with a rack $d^3$. At the rear of the machine are a series of shafts $d^4$—one for each type-bar—which shafts are supported in suitable supports $d^5$, secured to the main frame of the machine, each shaft being provided with a pinion $d^6$, which meshes with its corresponding type-bar, and at the other end with a pinion $d^7$, which meshes with a rack $d^8$, said racks being supported in suitable guides on the frame and connected to the rack-bars $c'$ by means of connections $d^9$, Fig. 4, so as to move therewith when the racks $c'$ are moved by the operation of the swinging segments $c$ a distance determined by the depression of a key in any denomination, and thus through the medium of the shafts $d^4$ move the respective type-bars $d$ so as to bring the type thereon (corresponding to the key depressed) in a proper position to be printed in the manner hereinafter described.

Adjacent to the respective type-bars $d$ is what I term a "presser-lever" $e$, pivoted to the side frame of the machine at a point below said bars and extending upwardly to a point opposite the type on said bars, where it is provided with a rearwardly-extending head $e'$, preferably having a rubber cushion $e^2$ on the side adjacent to the type-bars, a spring $e^3$, connected to the presser-lever $e$, tending to normally hold said lever and its head slightly away from said type-bars. Also pivoted to the side frame of the machine at a point adjacent to the presser-lever $e$ is a bell-crank lever $e^4$, one arm, $e^5$, of which extends upwardly and is adapted to contact with the upper end of the presser-lever $e$, the other arm, $e^6$, extending in a forward direction. Pivoted to the forward end of the bell-crank arm $e^6$ is a cam-arm $e^7$, which extends rearwardly toward the pivotal point of said bell-crank lever and is provided on its inner side, near the rear end thereof, with a beveled projection $e^8$, which normally rests against the beveled end $e^9$ of an upwardly-extending shaft-arm $e^{10}$ on the main operating-shaft 1, the bevel $e^9$ of the end of the shaft-arm $e^{10}$ being in an opposite direction from the bevel of the projection $e^8$, as shown. Extending laterally from the bell-crank arm $e^6$ just above the inner end of the cam-arm $e^7$ is a pin $e^{11}$, with which the said cam-arm is adapted to contact. It will now be seen that as the main operating-lever $a$ is drawn down the beveled end of the shaft-arm $e^{10}$ contacting with the beveled projection $e^8$ will force the cam-arm $e^7$ against the pin $e^{11}$, thus swinging the bell-crank lever and causing the arm $e^5$ thereof to contact with the presser-lever $e$, thus forcing the cushion $e^2$ of said presser-lever against the type.

Figures 3, 4, 5, 6, 7, 8, 9:
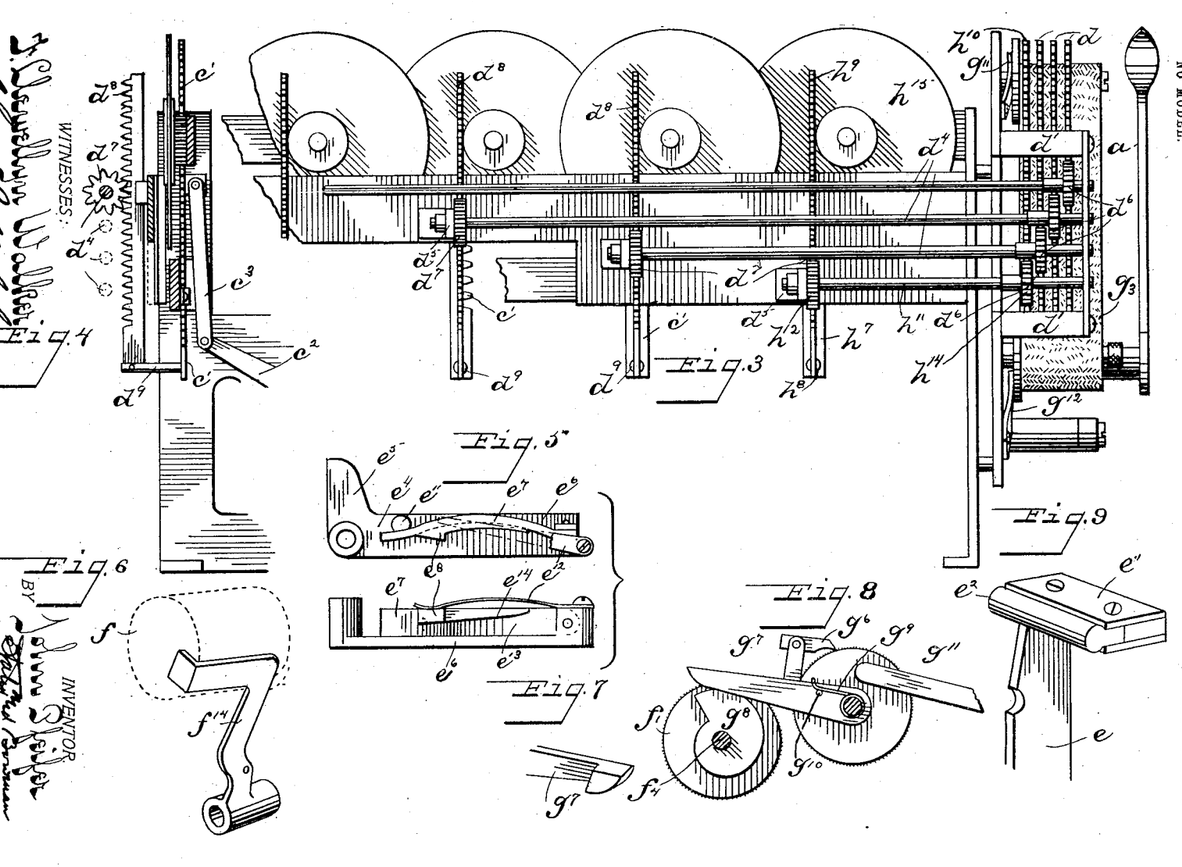

The cam-arm $e^7$ is pivoted to the bell-crank arm $e^6$ in a manner to permit it to swing laterally thereon, a spring $e^{12}$ being provided to hold the said cam-arm normally up against the said bell-crank arm $e^6$. The under side of the cam-arm is provided with an inclined groove or recess $e^{13}$, extending from near the forward or pivoted end thereof back to a point adjacent to the beveled projection $e^8$ on said cam-lever, and that portion $e^{14}$ of the cam-lever forming one side of the recess is beveled, as shown in Fig. 5, so as to form a camway. As the operating-lever is drawn down, the beveled end of the arm $e^{10}$ after passing the beveled projection $e^8$ on the cam-arm will follow the portion $e^{14}$ of the cam-arm until it reaches the camway $e^{13}$, at which point it will enter the camway and as the operating-shaft starts on its return movement will follow the camway and force the cam-arm in a lateral direction against the tension of its spring $e^{12}$ and will pass out of the camway at the rear end thereof, at which point, however, it has passed to the side of the beveled projection $e^8$, the spring $e^{12}$ immediately returning the cam-arm to its normal position.

The rolls for carrying the paper strip upon which the records are printed are shown at $f$ and $f'$, the paper strip $f^2$ passing from the roll $f$ around the guides $f^3$, so as to pass between the type-bars and the presser-lever $e$, and thence to the roll $f'$, upon which it is wound at each operation of the machine after the operation of printing has been performed. In order to accomplish this, I pivot on the shaft $f^4$, which carries the roll $f'$, a pawl-lever $f^5$, carrying a pawl $f^6$, which engages with the ratchet-teeth on said roll $f'$, said lever $f^5$ normally resting against the projection $f^7$ on the frame. The lower end of the pawl-lever is provided with a laterally-projecting pin $f^8$, which extends into the slot $f^9$ of an upwardly-projecting arm $f^{10}$, pivoted loosely on said shaft 1. The arm $e^{10}$ has a laterally-extending pin or projection $f^{11}$, which after said arm has passed the beveled projection $e^8$ contacts with the arm $f^{10}$ and carries the same forward therewith, thus imparting movement to the pawl-lever $f^5$ and causing the same by means of the pawl $f^6$ to move the paper-roll $f'$, so as to wind the paper thereon, the pawl-lever being returned to its normal position by the action of the spring $f^{13}$ as the operating-lever $a$ returns. The roll $f$ is mounted loosely upon its shaft and is provided with a friction device $f^{14}$, Fig. 6, to which the spring $e^3$ is preferably attached, which device bears against the paper on said roll with a yielding pressure, and thus keeps the paper strip taut. A detent $f^{15}$ is provided to engage the ratchets on the roll $f'$, so as to hold same from turning in a backward direction. Small coiled springs serve to hold the pawl $f^6$ and the detent $f^{15}$ at all times in engagement with the ratchet on the roll $f'$ in a well-known manner.

I preferably employ the usual inking-ribbon $g^3$, which is supported on rolls $g$ and $g'$, the ribbon passing from the lower roll $g$ over suitable guides $g^4$, so as to come between the type-bars and paper strip, and thence onto the upper roll $g'$. These rolls are loosely journaled on studs attached to the side frame of the machine, and the upper roll $g'$ is provided with a ratchet-wheel $g^5$, with which engages the pawl $g^6$, pivoted on a pawl-lever $g^7$, which is journaled on the stud which supports the roll $g'$. The forward end of this pawl-lever $g^7$ is adapted to rest on a continuous cam $g^8$, Fig. 8, connected to the paper-roll shaft $f^4$, and is held in engagement therewith by the coiled spring $g^9$ contacting with the pin $g^{10}$ on said pawl-lever. By this construction as the paper-roll $f'$ is moved the cam $g^8$ will also give the pawl-lever $g^7$ a slight continuous advancing movement, so as to move the ribbon-roll $g'$. As soon as the cam-lever $g^7$ has passed the highest point of the cam $g^8$ it will immediately drop back under tension of the spring $g^9$ to the lowest point of the cam and be in a position to be again acted upon by the cam for the purpose of moving the said ribbon-roll. Friction-springs $g^{11}$ and $g^{12}$ are provided for the ribbon-roll, which serve to keep the ribbon at all times in a taut condition, the upper spring also serving as a detent to prevent backward movement of the roll.

The operation of the device as thus far described is as follows: The lever $a$ is first drawn down, thus unlocking the respective value-keys. By pressing any one of the keys in any of the denominations the swinging segments corresponding to the banks in which the keys are depressed are released, and as the operating-lever returns to its normal position these segments will swing until they contact with the keys depressed, carrying with them the rack-bars $c'$ and also the rack-bars $d^8$ connected thereto. These rack-bars $d^8$ being geared to the respective shafts $d^4$ will cause said shafts to rotate, and thus elevate the type-bars and bring the type on said bars corresponding to the value of the keys depressed into a position opposite the head $e'$ of the presser-lever. As the operating-lever $a$ is again drawn down, the beveled end of the projecting arm $e^{10}$, contacting with the beveled projection on the cam-arm $e^7$, will throw the arm $e^5$ of the bell-crank lever in contact with the presser-lever $e$, and thus bring the head of said lever up against the type-bars and print the amounts represented by the type-bars on the recording-strip, which amounts will represent the value of the keys depressed at the previous operation of the machine. As soon as the beveled end of the arm $e^{11}$ has passed the beveled projection on the cam-arm the lever $e$ will be allowed to return to its normal position by the action of the spring $e^3$, which will at the same time throw the bell-crank lever $e^4$ back to its normal position, so that the beveled end of the lever $e^{10}$ will run along the under raised surface $e^{14}$ of said cam-lever until it reaches the camway $e^{13}$. Immediately after the end of the lever $e^{10}$ has passed the projection $e^8$ of the cam-arm, and therefore after the operation of printing has been performed, the projecting pin $f^{11}$ will contact with the forked arm $f^{10}$ and carry the pawl-lever $f^5$ forwardly, and thus move the paper-roll $f'$, so as to bring a new surface of the paper in position for the next record. At the same time the ribbon-roll will be very slightly moved by the action of the cam $g^8$ on the pawl-lever $g^7$. As the operating-lever is released and returns to its normal position under the action of its spring, the end of the arm $e^{10}$ will enter the camway $e^{13}$ of the cam-arm $e^7$ and force said cam-arm laterally against the tension of its spring, so as to allow the end of the arm $e^{10}$ to pass to the side of the beveled projection on said cam-arm. As soon as the end of the arm $e^{10}$ has passed the beveled projection it will pass out of the cam-groove $e^{13}$, and the cam-arm $e^7$ will then return to its normal position under the action of its spring $e^{12}$, and the parts will be in position for another operation. It should be stated that the type-bars when in their normal position stand with the zero character opposite the presser-lever, so that this character will be printed on the tape if no value-key has been depressed in the bank to which any type-bar belongs.

I will next describe the mechanism by which a record may be kept of the particular person or clerk making the registration on the machine. To accomplish this, I employ a series of special or clerks' keys, three of which are shown in the drawings, although as many may be used as desired. I have shown these keys and their connecting mechanism placed above the upper row of cash-keys, although, if desired, they may be placed at the side of these keys, the position which I have given them being one which will allow the mechanism to be placed within a much smaller space than otherwise. The keys $h$ are pivoted on the shaft 2 preferably so as to alternate with the value-keys. The inner ends of these special or clerks' keys normally rest on the locking-plate $c^4$, although the keys are formed shorter than the value-keys, so as not to contact with the locking portion of said plates and be locked thereby, as in the case of the value-keys. Each key is provided with an upwardly-extending arm $h'$, provided at its upper end with a hook $h^2$ and an inwardly-extending finger $h^3$. These projecting fingers $h^3$ are adapted to form stops for determining the movement of a swinging segment $h^4$, pivoted to the main shaft 1 of the machine and provided with a series of steps to correspond with the respective clerks' keys in a manner similar to the construction of the segments $c$. The segments $h^4$, however, are smaller than the segments $c$ and swing thereon so as not to interfere with the same. The segment $h^4$ is provided with a rearwardly-extending arm $h^5$, which is connected by a link $h^6$ to a vertically-sliding guide-plate $h^7$, said guide-plate $h^7$ being attached by a connection $h^8$ to a vertical rack-bar $h^9$, which is mounted in suitable guides at the rear of the machine similar to the rack-bars $d^3$, previously described. The rack-bar $h^9$ is connected to a type-bar $h^{10}$, which will form one of the series of type-bars $d$ and which will have on it type corresponding to the characters of the respective clerks' keys, the connection from this rack-bar $h^9$ to its type-bar being made by the shaft $h^{11}$, connected to the rack by a pinion $h^{12}$ and to the type-bar $h^{10}$ by a pinion $h^{14}$. If desired, the vertically-movable guide-plate $h^7$ may be geared or connected to an indicator $h^{15}$, Fig. 3, for indicating the clerk making the transaction, or the plate $h^7$ itself may be provided with characters corresponding to the special keys to make the required indications. When the key $h$ is depressed, it is held in its depressed position by a swinging catch $i$, attached by arms $i'$ to a rod $i^2$ in a supporting-frame $i^3$, which frame is supported by means of forwardly-extending arms $i^4$ to the shaft-rod 3 and also to the main shaft 1 by a rearwardly-extending arm $i^5$. A spring $i^6$, connected to a projection $i^7$ of one of the arms $i'$, tends to swing the said catch $i$ in a rearward position to engage the hooks of said keys when the same are elevated, the catch being permitted to swing slightly against the tension of the spring, so as to allow the hooks to pass and be engaged thereby. To release the keys which have been engaged by the catch $i$, I provide on one of the arms $i'$ a pivoted pawl $i^8$, adapted as the operating-lever is drawn down to contact with the projection $i^9$ on the shaft 1, and thus swing the catch slightly, so as to release the keys held thereby, said pawl being adapted to swing and allow the projection to pass the same on the return movement thereof. To provide for locking these clerks' or special keys when the machine is in its normal or inoperative position, I provide a rearwardly-extending arm $j$, formed at its forward end with a bifurcated portion $j^2$, which is journaled on the rod 3. The arm is curved or arched, so as to extend over the catch $i$, and the inner end thereof extends under the main shaft 1 in proximity to a cam $j^3$ on said shaft, said arm $j$ being held in contact with said cam by means of the spring $i^6$, attached to the bifurcated portion thereof, the construction being such that when the operating-lever returns to its normal position the cam will force the arm downwardly against the tension of its spring, so that a projection $j^4$ on said arm will be brought in proximity to the catch $i$ and form a bar therefor, so as to prevent any movement thereof, thus preventing any operation of the keys.

When the operating-lever $a$ has been drawn down to the limit of its stroke, it is locked in this position until a clerk's key has been depressed, thus insuring a record of the clerk performing the transaction on the machine before a registration or indication can be made thereon. This I accomplish by providing a swinging catch $k$, pivoted to the rod 3 by means of forwardly-extending arms $k'$ and which is provided with a rearwardly-extending finger $k^3$, having a shouldered end $k^4$, which is adapted to engage a lateral projection $k^5$ on a collar $k^6$ on the main shaft 1 when the operating-lever is depressed, and thus lock the lever against return movement. This catch $k$ extends across the entire series of clerks' or special keys, so that when a key of the series is depressed the upper portion of the finger $h'$ thereon will contact with the catch $k$, raising the shouldered end $k^4$ from the projection $k^5$, thus releasing the operating-lever and allowing the same to return to its normal position, the shouldered end of the finger automatically dropping over the projection again as the operating-lever is again drawn down.

Figure 10:
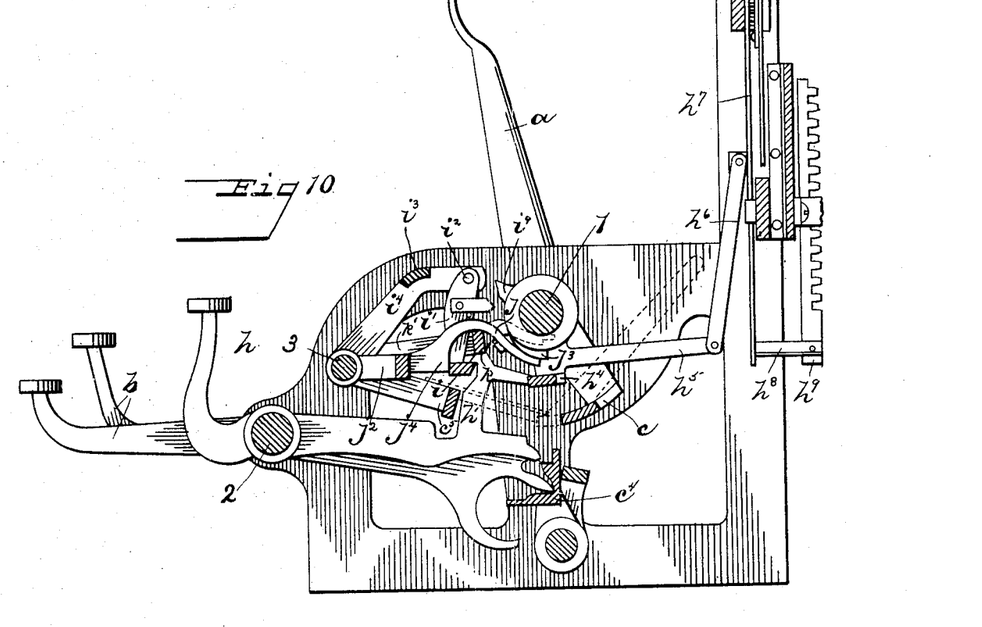
Fig. 10 is a sectional view on the line $x\ x$ in Fig. 1, showing the special or clerks' keys mechanism.
Figure 11:
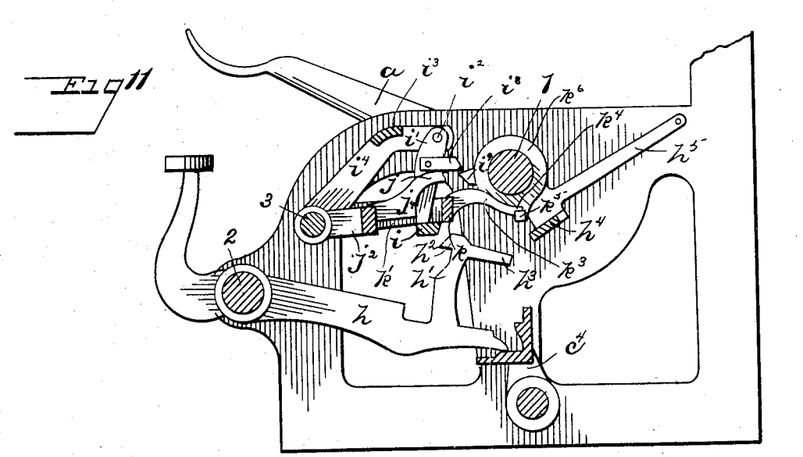
Fig. 11 is a similar section showing the parts in different positions.
Figures 12, 13:
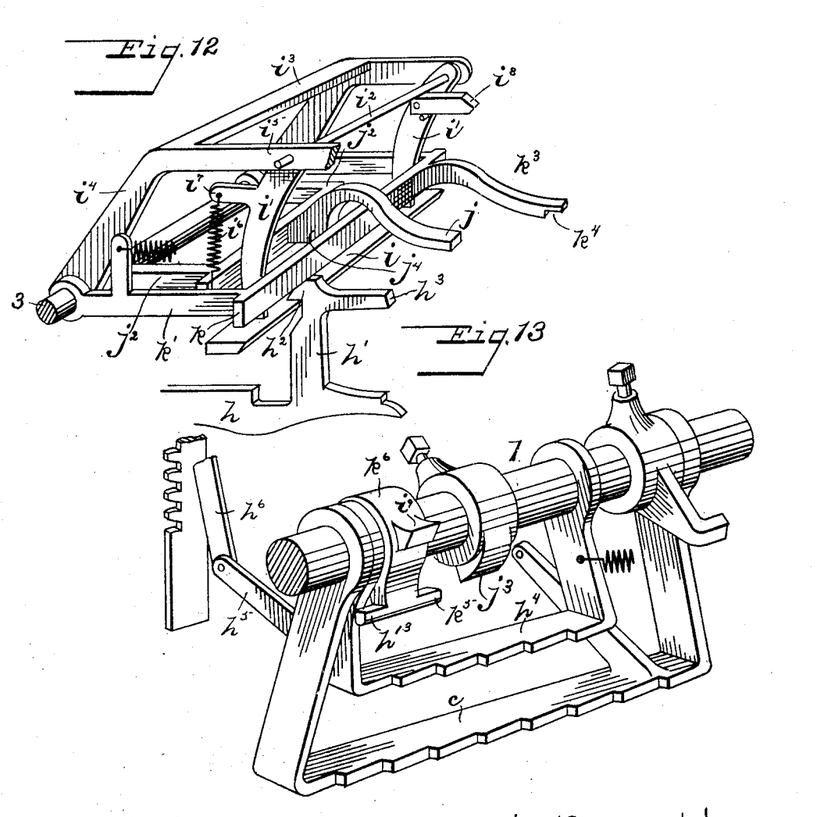
Figs. 12 and 13 are detail views of the same.

The swinging segment $h^4$, it should be stated, is adapted to be engaged and swung laterally by a projection $h^{13}$ on the collar $k^6$ on the main shaft as the operating-shaft is drawn down, and it is held in this position by said projection until after a special or clerk's key $h$ has been depressed, thus releasing the operating-lever $a$ and allowing it to return to its normal position, at which time the segment $h^4$ will swing until it contacts with the finger $h^3$ of the key $h$ which has been depressed. The operation of this part of the machine is as follows: In the normal condition of the machine all the keys are locked, the value-keys as well as the special or clerks' keys, the latter by means of the projection $j^4$ contacting with and forming a bar for the swinging catch $i$, as shown in Fig. 10. As the operating-lever is drawn down the cam $j^3$ will be removed from contact with the arm $j$, thus allowing the arm and its projection $j^4$ to be drawn upwardly by the spring $i^6$ to unlock the swinging catch $i$, after which the projection $i^9$ on the shaft contacting with the pawl $i^8$ will swing said catch and release the keys held thereby. At the same time the projection $h^{13}$, contacting with one of the side arms of the segment $h$, will swing said segment rearwardly from contact with the depressed key and hold said segment in this position. As the operating-lever reaches the limit of its downward stroke the shoulder $k^4$ on the arm $k^3$ will drop over the lateral projection $k^5$ on the main shaft, and thus lock the operating-lever from returning to its normal position. After the value-keys necessary to make the registration required have been depressed one of the series of clerks' keys $h$ must be depressed. As this key is depressed the upper end of the arm $h'$, contacting with the swinging catch $i$, will swing the same sufficiently to allow the hook $h^2$ to pass the same, when it will immediately spring back and engage said hook. At the same time the upper part of said arm $h'$ will contact with the bar $k$ and elevate the shouldered end of the arm $k^3$ from contact with the projection $k^5$, and thus allow the main shaft and the operating-lever to return to their normal positions. As the shaft returns the segment $h^4$ thereon will swing until it contacts with the finger $h^3$ of the clerk's key which has been depressed, this movement of the segment carrying with it, through the medium of the arm $h^5$, the link $h^6$, the sliding plate $h^7$, and by the connection $h^8$ the rack-bar $h^9$, which will, through the medium of the connections heretofore described, move the type-bar representing the clerks' keys depressed a distance sufficient to bring the letter on said type-bar corresponding to the key depressed in a position to be printed on the type.

From the operation as thus far described it will be seen that by the first movement of the operating-lever the operation of printing is performed by which the character corresponding to the clerk's key operated at the preceding transaction, as well as the amounts of the cash-keys depressed at that time, are printed on the strip, the operation of returning the parts to normal position and unlocking the keys to permit another transaction being accomplished by the succeeding movement of the lever.

Figure 1:
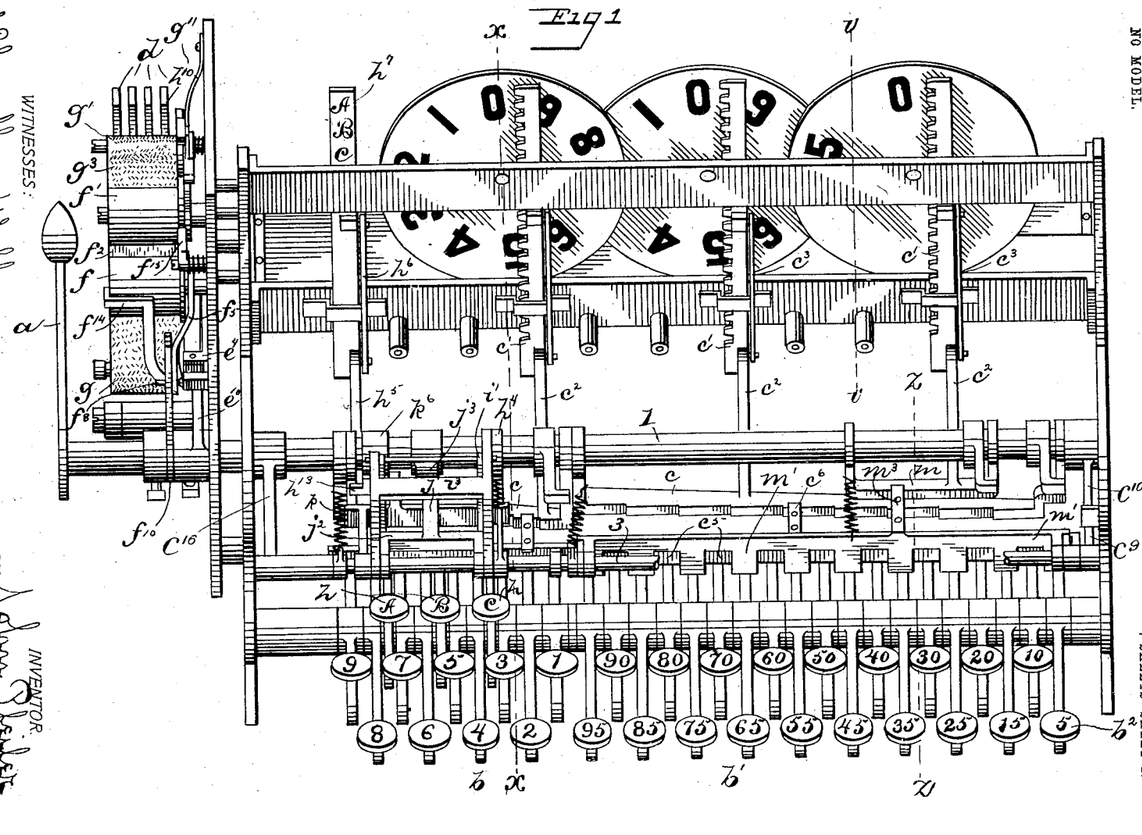
Figure 1 is a front elevation, taken from an altitude of thirty degrees, of a machine embodying my invention.
Figure 2:
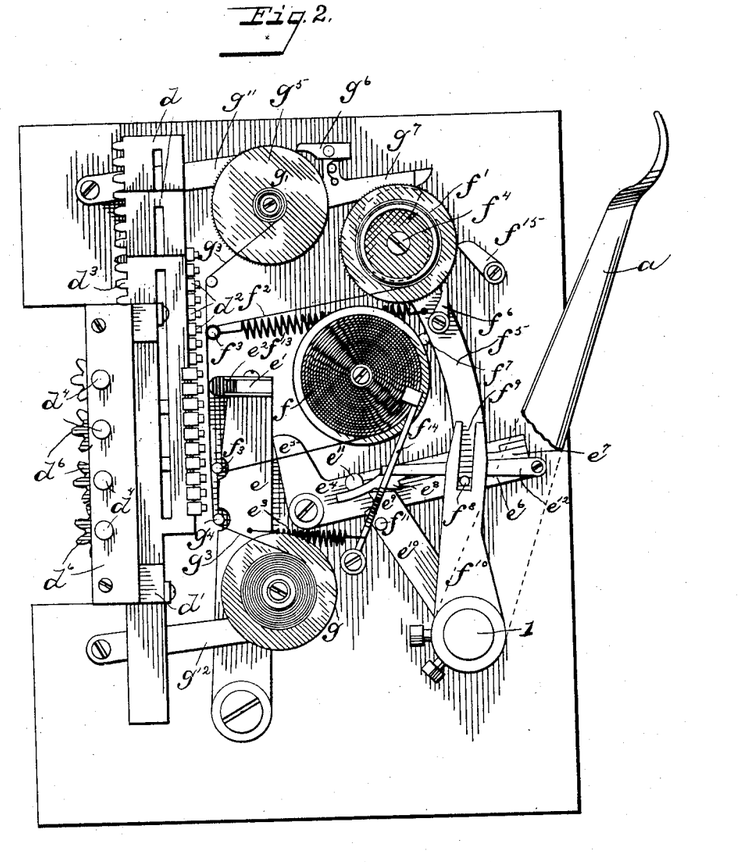
Fig. 2 is a side elevation of the printing mechanism.
Figure 14:
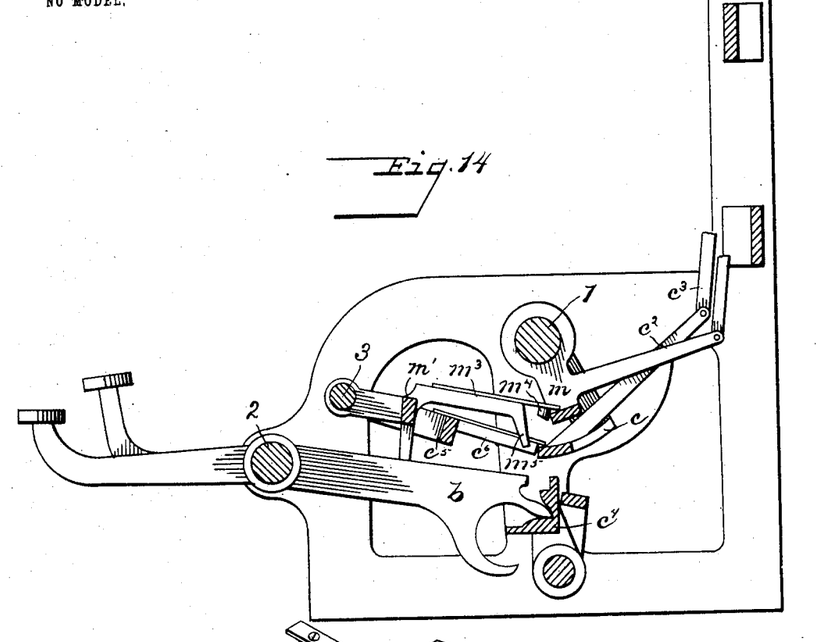
Fig. 14 is a sectional view on the line $z\ z$ in Fig. 1, showing the means for connecting the keys from five to ninety-five cents to the series of keys from ten to ninety cents.
Figures 15, 16:
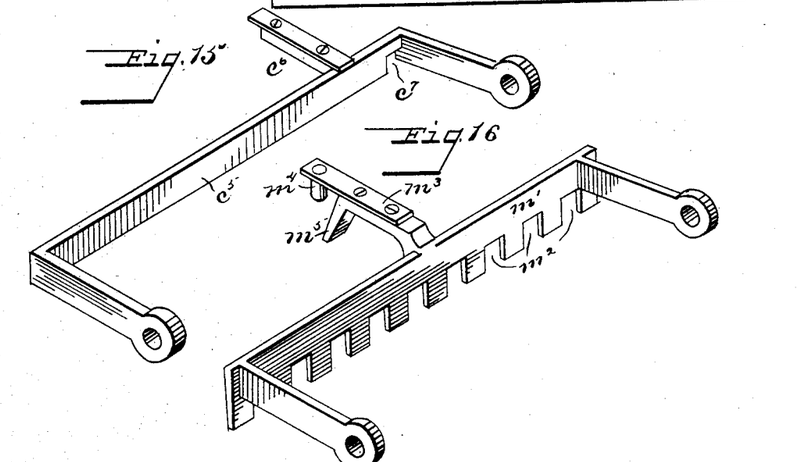
Figures 17, 18:
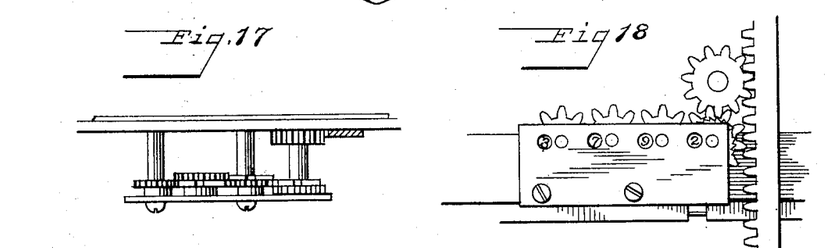
Figs. 17 and 18 are views of a common form of register which may be used in my machine.

I will next describe the mechanism by which I am enabled to register and indicate any amounts in the tens series ending with five by the operation of a single tens-key. To accomplish this, I extend the swinging segment $c$ for the tens-bank of keys entirely across the keys representing the tens and units denominations. In this case, however, I have arranged the keys representing ten cents, twenty cents, &c., up to and including ninety cents, across the space usually allotted to the tens and units denominations, and the keys representing five cents, fifteen cents, &c., up to and including ninety-five cents, are likewise arranged, the former series of keys constituting the upper row and the latter series the lower row, as shown in Fig. 1. The segment $c$ is connected to the registering-wheels representing the tens denomination and also to the indicator corresponding to this denomination. In this instance, however, the units denomination is represented by but one key— the five-cent key—and a swinging segment $m$, Fig. 14, is provided to operate the units register and indicator. This segment is not graduated, but is adapted to swing the same distance each time, so as to move the units registering wheel and indicator connected thereto a distance equal to five cents. The segment $c$ is provided with the usual catch $c^5$, pivoted to the frame-rod 3 and having the finger $c^6$ to hold the segment in its normal position, which catch extends across the entire series of keys from five to ninety-five and will be operated by any one of these keys except the five-cent key to release the segment $c$. The segment $m$ is held in its normal position by a catch $m'$, likewise pivoted to the frame-rod 3 and extending across the entire series of keys. This catch is, however, provided with a series of slots $m^2$, which register with the keys in the upper row or those keys which represent amounts not ending in five. The catch is further provided with a rearwardly-extending arm $m^3$, having at the end thereof a projection $m^4$ to engage and hold the segment $m$. Extending downwardly from the arm $m^3$ is a finger $m^5$, adapted to form a stop for the segment $m$ when released, the finger being at such distance from said segment as to arrest the same at a point equal to five units, so that the registering and indicating wheels connected to the segment $m$ will be moved a distance corresponding to five cents. It will now be seen that if a key is depressed which represents an amount not ending in five—as, for instance, fifty cents—the catch $c^5$ only will be operated to release the segment $c$, the operated key passing into one of the slots on the catch $m$, and thus not affecting the same, fifty cents only being registered and indicated. If, however, the fifty-five-cent key, for instance, is operated, both the catch $c^5$ and the catch $m'$ will be raised and both segments $c$ and $m$ allowed to swing until arrested, the former by the operated key and the latter by the finger $m^5$, and thus upon the complete operation of the machine fifty-five cents will be registered and indicated. The catch $c^5$ is provided with a notch $c^7$ at the point therein over the five-cent key, so that in case the five-cent key only is depressed the catch $m'$ only will be operated, said key passing into the notch $c^7$, and thus not affecting the catch $c^5$.

In case it is desired to use a full set of units-keys from "1" to "9" the segment $m$ will be graduated and the units-keys adapted to form stops to limit the movement thereof in the usual way. In this case, however, it will be necessary to provide means for causing the keys in the units-bank of greater value than five cents to raise the catch $m'$ a sufficient distance to allow the segment $m$ in swinging to clear the finger $m^5$ and swing past the same to contact with the operated key, this catch being extended over the units series of keys, so as to be operated thereby to release the segment $m$. This may be done by giving a greater upward movement to the inner end of these keys—for instance, by changing the location of the projecting finger on the inner ends of the keys, which contacts with and is supported on the locking-plate $c^4$ when the keys are in a depressed condition. It would also be necessary to provide in that part of the catch $c^5$ which extends over the units-keys a series of notches $c^7$, so that the units-keys when depressed will enter said notches, and thus not operate this catch.

Having thus described my invention, I claim—

1. In a cash-recording machine, a printing mechanism, comprising a series of type members, a series of keys for determining the movement of said type members, a locking device for said keys, operating devices for said printing mechanism, and means connected with said operating devices for unlocking said keys after the operation of printing has been performed, substantially as specified.

2. In a cash-recording machine, a printing mechanism, comprising a series of type members, actuating devices for said type members normally locked keys for controlling the movement of said actuating devices, operating devices for said printing mechanism, and means controlled by said operating devices for unlocking said keys after the operation of printing has been performed, substantially as specified.

3. In a cash-recording machine, a printing mechanism comprising a series of movable type members, actuating devices for said type members controlled by a series of keys, a main shaft, devices connected to said shaft for operating said printing mechanism, and means also connected to said shaft for returning said actuating devices to normal position after the operation of printing takes place, substantially as specified.

4. In a cash-recording machine, a series of movable type members, one for each denomination, actuating devices connected to said type members, a series of keys for each denomination adapted to engage said devices and control the movement of said type members, a printing mechanism adjacent to said type members, an operating-lever for said printing mechanism, and means connected to said lever for returning said actuating devices and type members to normal position after the operation of printing has first been performed but during the same operation of the machine, substantially as specified.

5. In a cash recorder and indicator, a series of movable type members, one for each denomination, an indicator and operating mechanism therefor for each denomination, a series of keys for each denomination adapted to control the movement of the type members and indicators corresponding thereto, a printing mechanism adjacent to said type members and an operating device therefor, said operating device being also adapted to return said type members and indicator-operating mechanism to normal positions after the operation of printing has been first performed but during the same operation of the machine, substantially as specified.

6. In a recording-machine, a series of movable type members, one member for each denomination represented on the machine, a swinging segment and a rack connection for each of said type members, a series of keys for each segment adapted to control the movement thereof, a printing mechanism adjacent to said type members, an operating device connected respectively to said printing mechanism and to each of said swinging segments, the connection being such that said printing mechanism is adapted to be operated prior to the time of the operation of said swinging segments, substantially as specified.

7. In a cash recorder and indicator, a series of movable type members and a series of indicators, one type member and one indicator for each denomination represented on the machine, a swinging segment with a rack connection to each of said type members and indicators, a series of keys for each segment adapted to control the movement thereof, a printing mechanism adjacent to said type members, and an operating device for said printing mechanism and segments, said printing mechanism being adapted to be operated by said operating device prior to the time of the operation of said segments thereby, substantially as specified.

8. In a cash-recording machine, a printing mechanism, devices for operating said mechanism, comprising a swinging lever and a cam-lever pivoted thereto, and means, as the operating parts are returned to normal position, for moving said cam-lever from operative position, substantially as specified.

9. In a cash-recording machine, a printing mechanism, devices for operating said mechanism comprising a pivoted lever, a projection on said lever, an operating-shaft having an arm to contact with said projection, and means on said lever for throwing said projection to inoperative position as the parts are returned to their normal position, substantially as specified.

10. In a recording-machine, a printing mechanism, an operating-lever, and connecting devices from said lever to said printing mechanism to operate the same as the lever is moved in one direction, said connecting devices including a pivoted cam-lever having a guideway therein for throwing said devices into inoperative position as said lever is returned to its normal position, substantially as specified.

11. In a recording-machine, a printing mechanism, comprising a swinging bell-crank lever, devices for operating said lever, and means on said lever consisting of a laterally-movable pivoted cam-arm having a guideway for disconnecting said operating devices from operative relation with said bell-crank lever, substantially as specified.

12. In a cash-recording machine, a printing mechanism, comprising movable type members, a pivoted presser-lever, a bell-crank lever, one arm of which is adapted to contact with said presser-lever, an operating-shaft, a connection from said shaft to the other arm of said bell-crank lever, so as to operate the same as the shaft is revolved in one direction, and means for throwing said connection into inoperative relation as the shaft returns to normal position, substantially as specified.

13. In a cash-recording machine, a printing mechanism, comprising a pivoted lever, a cam-arm pivoted to said lever adapted to operate same, a projection on said cam-arm, an operating-shaft having an arm to contact with said projection as the shaft is rotated in one direction, and a camway on said cam-arm adapted to be engaged by said shaft-arm to throw said projection out of the path of said shaft-arm as the shaft returns to normal position, substantially as specified.

14. In a recording-machine, the combination with printing mechanism comprising a paper-carrying roll and a ribbon-roll, and operating devices for said printing mechanism and paper-roll, and means, comprising a continuous cam, for operating said ribbon-roll from said paper-roll, substantially as specified.

15. In a recording-machine, the combination with printing devices, a paper-carrying roll and a ribbon-roll, and operating devices for same, of a continuous cam connected to said paper-roll and a pawl-lever connected to said ribbon-roll, said pawl-lever being adapted to engage said cam to continuously operate said ribbon-roll as the paper-roll is moved, substantially as specified.

16. In a recording-machine, a recording mechanism, actuating devices for said mechanism comprising a rotating shaft, a series of keys for controlling the movement of said actuating devices, a swinging catch for said keys, a lock for said catch, devices on said shaft for unlocking said catch and swinging the same to release said keys, and means for locking said shaft in its operated position until a key has been operated, substantially as specified.

17. In a recording-machine, a recording mechanism, actuating devices for said mechanism comprising a rotating shaft, a series of keys for controlling the movement of said actuating devices, a swinging catch for holding said keys in their operated position, and a lock for said catch, said lock being controlled by a cam on said shaft to release said catch when the shaft is operated, substantially as specified.

18. In a recording-machine, a recording mechanism actuating devices for said mechanism comprising a rotating shaft, a series of keys to control the movement of said actuating devices, a lateral projection on said shaft and a swinging catch to engage said projection when the shaft is in its operated position, said keys being adapted to engage said catch when operated to raise the same from said lateral projection and thus release said shaft, substantially as and for the purpose specified.

19. In a recording-machine, recording mechanism comprising movable type members, a swinging segment connected thereto, a series of keys for controlling the movement of said segment, a swinging catch for said keys, a lock for said catch, and a shaft having means for actuating said segment and unlocking and swinging said catch to release the keys, substantially as specified.

20. In a recording-machine, recording mechanism comprising movable type members, actuating devices for said type members comprising a rotating shaft, a series of keys to limit the movement of said type members, a catch for said keys and a lock for said catch, a spring for normally holding said lock in inoperative position, and a cam on said shaft for operating said lock, substantially as specified.

21. In a cash-recorder, cash-recording mechanism and a special recording mechanism, a series of normally locked keys for each of said mechanisms to control the movement thereof, an operating-shaft adapted when operated to unlock said keys and return said mechanisms to normal positions, and a lock for said shaft controlled by said special keys to prevent return movement of said shaft until a special key has been operated, substantially as specified.

22. In a cash-recorder, cash-recording mechanism and a special recording mechanism, a series of normally locked keys for each of said mechanisms to control the movement thereof, an operating device adapted when operated to unlock said keys and move said recording mechanisms, and means controlled by the special keys for locking said operating device against return movement until a special key has been operated, substantially as specified.

23. In a cash-recorder, cash-recording mechanism and a special recording mechanism, a swinging segment connected to each of said mechanisms, and a series of normally locked keys for each of said segments and adapted to control the movement thereof, an operating device adapted when moved in one direction to unlock said keys and return said swinging segments to normal position, and a lock for said operating device controlled by said special keys adapted to prevent return movement thereof until a special key has been operated, substantially as specified.

24. In a cash registering or recording machine, cash registering or recording mechanism, and a special recording mechanism, operating devices for said mechanisms, a series of keys for each of said mechanisms to determine the movement thereof, a pivoted catch for the series of special keys, and means, controlled by the operating devices, for operating said catch to lock said special keys when said operating mechanism is in its normal inoperative position, substantially as specified.

25. In a cash register and recorder, the combination with an operating-shaft, and operating mechanism connected to said shaft, a series of cash-keys and a series of special keys for determining the movement of said operating mechanism, a lock for said special keys, a cam on said shaft for operating said lock to release said special keys when said shaft is rotated, and means for preventing the return of said shaft until a special key has been operated, substantially as specified.

26. In a cash register and recorder, the combination with an operating-shaft, operating mechanism connected to said shaft, a series of cash-keys and a series of special keys for determining the movement of said operating mechanism, a lock for said special keys, means on said shaft for releasing said special keys as said shaft is operated, a projection on said shaft and a catch to engage said projection, said catch being operated by a depression of one of said special keys to release said shaft, substantially as specified.

27. In a cash register and indicator, registering and indicating mechanism, series of keys representing different denominations, adapted to control the movement of said mechanism, releasing devices for said mechanism also controlled by said keys, a connection from certain of the keys of the higher denomination to the releasing devices of the next lower denomination to operate the same when any of the said keys are operated, and means for arresting the registering and indicating mechanism corresponding thereto at a certain predetermined point, substantially as specified.

28. In a cash register and indicator, a register and indicator, one for each denomination, a series of keys for each of said registers and indicators, a swinging segment connected to each register and indicator and adapted to be controlled by the series of keys corresponding to its denomination, a releasing device for each of said segments also controlled by said keys, a connection from certain of the keys of a higher denomination to the releasing device of the next lower denomination so that the operation of said keys will operate said releasing device, and means on said releasing device for arresting the segment corresponding thereto at a certain predetermined point, substantially as specified.

29. In a cash register and indicator, a series of registering and indicating mechanisms representing different denominations, a swinging actuating device for each of said mechanisms, a series of keys for each denomination adapted to control the movement of the actuating device corresponding to its denomination, and a releasing device for the actuating device of the lower denomination consisting of a pivoted bar adapted to extend over the keys of the next higher denomination and be engaged and operated by certain of said keys to release the actuating mechanism corresponding thereto, and means on said bar to arrest said actuating mechanism at a certain point in the movement thereof, substantially as specified.

30. In a cash register and indicator, registering and indicating devices, one for each denomination, a swinging actuating device for each of said mechanisms, a series of keys for each actuating device adapted to control the movement thereof, a pivoted catch for the actuating device of one of said denominations consisting of a bar provided with an inwardly-extending arm to engage said actuating device, said bar being also extended over the keys of the next higher denomination so as to be engaged by certain of said keys, and being provided with a series of notches to prevent engagement therewith by the balance of of the keys, and a downwardly-projecting finger on said arm to form a stop for said actuating device when the bar is operated, substantially as specified.

31. In a cash-register, the combination with a series of type members, of a series of keys for determining the movements of said type members, locking devices for said keys for normally preventing any operation of the same, means for taking an impression from the type members, and devices for actuating the impressing means and unlocking the keys after the impression has been taken.

32. In a cash-register, the combination with a printing mechanism, of a series of type-carriers, a series of keys for determining the movements of said carriers, locking devices for locking the keys in both their unoperated and operated positions, impression devices, and mechanism for controlling the impression devices and subsequently operating the key-locking means.

33. In a cash-register, the combination with a series of oscillatory operating elements, of type-carriers connected to said elements, means for limiting the movements of the elements in one direction, an operating-handle for moving the elements in the opposite direction, impression devices, a lock for the means which limits the movement of the oscillatory members, and mechanism connected to the operating-handle for first operating the impression devices and then said lock.

34. In a cash-register, the combination with a series of registering elements, of an oscillatory handle for actuating said elements, means for locking said handle in a partially-operated position, and controlling devices which when operated release said handle, the construction being such that the handle remains locked in such partially-operated position until the controlling devices are first operated.

35. In a cash-register, the combination with a series of operating elements, of means for limiting the movements of the same, a handle for actuating said elements, a lock for automatically locking said handle in a partially-operated position, and a series of controlling-keys which when operated release said handle.

36. In a cash-register, the combination with a series of operating elements, of keys for limiting the movements of the elements in one direction, an operating-handle for moving the elements in the opposite direction, a lock for locking the operating-handle, and a series of special controlling-keys for unlocking said handle.

37. In a cash-register, the combination with a series of oscillatory graduated elements, of a series of keys for limiting the movements of the elements in one direction, an operating-handle for returning the elements to their normal positions, a lock for securing the handle in a partially-operated position, and special controlling devices for operating said lock to release the handle.

38. In a cash-register, the combination with a series of operating elements, of a series of keys for limiting the movements of the elements in one direction, indicators connected to said elements, an operating-handle for returning the elements to their normal positions, a lock for securing the operating-handle in a partially-operated position, a series of special keys, controlling means intermediate the special keys and lock, and a special indicator controlled by said special keys.

39. In a cash-register, the combination with a yoke-frame having graduated projections along one edge, of a series of keys for limiting the movements of said frame, a second yoke-frame pivotally mounted within the first frame and also provided with graduated projections along one edge, a second series of keys arranged to coöperate with the last-mentioned frame to limit its movements without interfering with the first-mentioned frame, and a common means for returning the two frames to their normal positions.

40. In a cash-register, the combination with a series of operating elements, of keys for releasing and limiting the movements of the elements in one direction, an operating-handle for returning the elements to their normal positions, means for locking said handle in a partially-operated position, and means intermediate one of the series of keys and said lock for actuating the latter.

In testimony whereof I have hereunto set my hand this 30th day of November, A. D. 1901.

JOHN PFEIFER.

Witnesses:
CHAS. I. WELCH,
CLIFTON P. GRANT.